(12) United States Patent
Ivaciov

(10) Patent No.: US 8,296,326 B1
(45) Date of Patent: Oct. 23, 2012

(54) GRID-BASED USER INTERFACE TECHNIQUES FOR INTERACTING WITH NESTED HIERARCHICAL DATA STRUCTURES

(75) Inventor: Stanislav Ivaciov, West Windsor, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 249 days.

(21) Appl. No.: 12/860,195

(22) Filed: Aug. 20, 2010

(51) Int. Cl.
*G06F 7/00* (2006.01)
*G06F 17/30* (2006.01)

(52) U.S. Cl. ..................................................... 707/797

(58) Field of Classification Search .................. 707/797, 707/999.101
See application file for complete search history.

(56) References Cited

U.S. PATENT DOCUMENTS

| | | | |
|---|---|---|---|
| 6,456,998 B1* | 9/2002 | Bui et al. | 1/1 |
| 2006/0101041 A1* | 5/2006 | Agarwal et al. | 707/100 |
| 2009/0112913 A1* | 4/2009 | Murthy et al. | 707/102 |
| 2010/0125779 A1* | 5/2010 | Choudhury | 715/227 |

* cited by examiner

*Primary Examiner* — Alexey Shmatov

(57) ABSTRACT

An improved graphical user interface (GUI) for accessing an Open Mobile Alliance (OMA) has defined Device Management (DM) state of a mobile device is provided via a technique for transforming an OMA DM hierarchical data structure, such as a tree structure having a number of nodes, into a grid-based user interface element.

18 Claims, 13 Drawing Sheets

480

| | Elem Header | subElem1 Header | subElem2 Header |
|---|---|---|---|
| 491 → | | | |
| 492 → | parElem1 | | |
| 493 → | elem1 | A | B |
| 494 → | elem2 | C | D |
| 495 → | parElem2 | | |
| 496 → | elem3 | E | F |
| 497 → | elem4 | G | H |

↑ 481     ↑ 482     ↑ 483

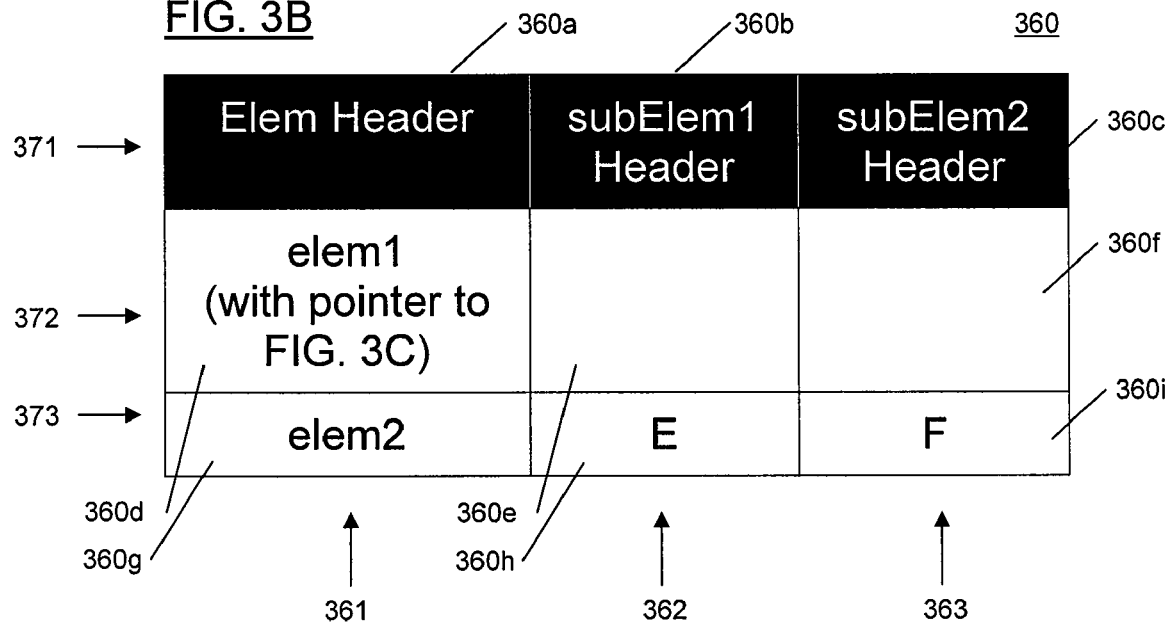
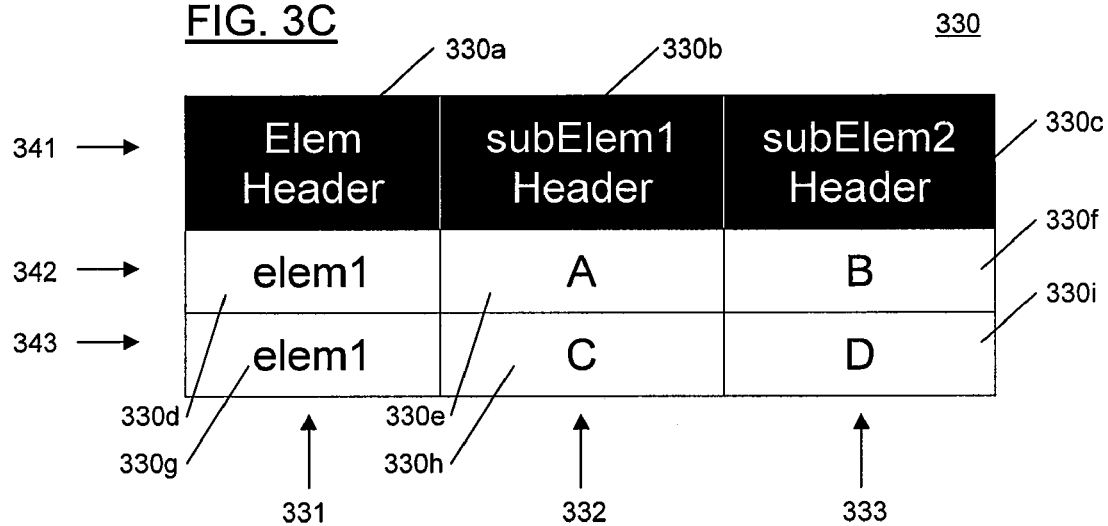

471 → | Elem Header |
472 → | parElem1 (with pointer to FIG. 4C) |
473 → | parElem2 (with pointer to FIG. 4D) |

| Elem Header | subElem1 Header | subElem2 Header |
|---|---|---|
| elem1 | A | B |
| elem2 | C | D |

| Elem Header | subElem1 Header | subElem2 Header |
|---|---|---|
| elem3 | E | F |
| elem4 | G | H |

FIG. 4E
480

| | Elem Header | subElem1 Header | subElem2 Header |
|---|---|---|---|
| 491 → | | | |
| 492 → | parElem1 | | |
| 493 → | elem1 | A | B |
| 494 → | elem2 | C | D |
| 495 → | parElem2 | | |
| 496 → | elem3 | E | F |
| 497 → | elem4 | G | H |

```xml
<SDMResponse>
    <Message-Header>
        <REQUEST_ID>IVR0123456789abcdef</REQUEST_ID>
        <OPERATION>RETRIEVExpectedDEVICExpectedPROFILE</OPERATION>
        <RESPONSExpectedDATExpectedTIME>07/20/2009 09:48:29</RESPONSExpectedDATExpectedTIME>
        <iMDMRequest_ID>12345</iMDMRequest_ID>
    </Message-Header>
    <Message-Data>
        <ErrorCode>ESB-SDM-0000</ErrorCode>
        <ErrorText>Successful</ErrorText>
        <DEVICE-PROFILE>                                    ← 501
            <DP-PRL-V id="0">
                <ReadOnly>YES</ReadOnly>
                <URI>./ManagedObjects/ConnMO/CDMA/Ext/Setting/PRLVer</URI>
                <Expected>N/A</Expected>
                <Actual>PRLversion</Actual>
                <Source>DEVICE-PROFILE</Source>
            </DP-PRL-V>
            <DP-ESN-MEID id="2">
                <Actual>MEID:A000000AB34985</Actual>
                <ReadOnly>YES</ReadOnly>
                <URI>./ManagedObjects/ConnMO/CDMA/Ext/Setting/ESNMEID</URI>
                <Source>DEVICE-PROFILE</Source>
                <Expected>N/A</Expected>
            </DP-ESN-MEID>
            <DP-MDN id="7">
                <ReadOnly>YES</ReadOnly>
                <Expected>N/A</Expected>
                <URI>./ManagedObjects/ConnMO/CDMA/Ext/Setting/MDN1</URI>
                <Source>DEVICE-PROFILE</Source>
                <Actual>4089629263</Actual>
            </DP-MDN>
            <DP-BLUETOOTH-DISCOVERY id="14">
                <ReadOnly>YES</ReadOnly>
                <URI>./ManagedObjects/DCMO/BlueTooth/Ext/DiscMode</URI>
                <Source>DEVICE-PROFILE</Source>
                <Expected>N/A</Expected>
                <Actual>True</Actual>
```

FIG. 5A-2

```
</DP-BLUETOOTH-DISCOVERY>
<DP-GPS-LOC id="26">                                                    ←——— 503
    <ReadOnly>NO</ReadOnly>
    <Expected>N/A</Expected>
    <Actual>True</Actual>                                               ←——— 504
    <URI>./ManagedObjects/DCMO/GPS/Enabled</URI>                        ←——— 505
    <Source>DEVICE-PROFILE</Source>
</DP-GPS-LOC>
<DP-OS-V id="31">
    <Source>DEVICE-PROFILE</Source>
    <ReadOnly>YES</ReadOnly>
    <URI>./DevDetail/SwV</URI>
    <Expected>N/A</Expected>
    <Actual>KAYAK081820050001</Actual>
</DP-OS-V>
<DP-FIRMWARE-V id="33">
    <URI>./DevDetail/FwV</URI>
    <Actual>V6</Actual>
    <ReadOnly>YES</ReadOnly>
    <Expected>N/A</Expected>
    <Source>DEVICE-PROFILE</Source>
</DP-FIRMWARE-V>
<DP-NTWK-DEVICE id="38">
    <ReadOnly>YES</ReadOnly>
    <Actual>1xEvDO</Actual>
    <Source>DEVICE-PROFILE</Source>
    <Expected>N/A</Expected>
    <URI>./ManagedObjects/DiagMon/RF/CurrentSystem</URI>
</DP-NTWK-DEVICE>
<DP-SIGNAL-STRENGTH id="40">
    <Source>DEVICE-PROFILE</Source>
    <ReadOnly>YES</ReadOnly>
    <Expected>N/A</Expected>
    <Actual>67</Actual>
    <URI>./ManagedObjects/DiagMon/RF/RSSI</URI>
</DP-SIGNAL-STRENGTH>
<DP-PAIRED-DEVICE id="43">
    <ReadOnly>YES</ReadOnly>
```

FIG. 5A-3

```
      <Actual>paireddevicelist</Actual>
      <URI>./ManagedObjects/DCMO/BlueTooth/DCMOConfig/PairedDevList</URI>
      <Source>DEVICE-PROFILE</Source>
      <Expected>N/A</Expected>
    </DP-PAIRED-DEVICE>
    <DP-BATTERY-STRENGTH id="48">
      <ReadOnly>YES</ReadOnly>
      <URI>./ManagedObjects/DiagMon/Battery/Level</URI>
      <Source>DEVICE-PROFILE</Source>
      <Expected>N/A</Expected>
      <Actual>93</Actual>
    </DP-BATTERY-STRENGTH>
    <DP-DEVICE-MEMORY id="57">
      <ReadOnly>YES</ReadOnly>
      <Expected>N/A</Expected>
      <Actual>53766</Actual>
      <URI>./ManagedObjects/DiagMon/Memory/Internal/Avail</URI>
      <Source>DEVICE-PROFILE</Source>
    </DP-DEVICE-MEMORY>
    <DP-CAMERA-ENABLED id="58">
      <ReadOnly>Yes</ReadOnly>
      <URI>./ManagedObjects/DCMO/Camera/DCMOConfig/DenyUserEnable</URI>
      <Actual>True</Actual>
      <Expected>N/A</Expected>
      <Source>DEVICE-PROFILE</Source>
    </DP-CAMERA-ENABLED>
  </DEVICE-PROFILE>
  <WIFI>  ◄─────────── 502
    <WIFI-WIFI id="50">
      <ReadOnly>Yes</ReadOnly>
      <Source>WIFI</Source>
      <Expected>True</Expected>
      <Actual>False</Actual>
      <URI>./ManagedObjects/DCMO/WLAN/DCMOConfig/DenyUserEnable</URI>
    </WIFI-WIFI>
  </WIFI>
 </Message-Data>
</SDMResponse>
```

| App Name/Config Parameter | Actual Value | Expected Value |
|---|---:|---:|
| DEVICE-PROFILE | | |
| PRL V | PRLversion | N/A |
| ESN-MEID | MEID:A000000AB34985 | N/A |
| MDN | 4089629263 | N/A |
| BLUETOOTH-DISCOVERY | True | N/A |
| GPS-LOC | True | N/A |
| OS-V | KAYAK081820050001 | N/A |
| FIRMWARE-V | V6 | N/A |
| NTWK-DEVICE | 1xEvDO | N/A |
| SIGNAL-STRENGTH | 67 | N/A |
| PAIRED-DEVICE | paireddevicelist | N/A |
| BATTERY-STRENGTH | 93 | N/A |
| DEVICE-MEMORY | 53766 | N/A |
| ESN-MEID | True | N/A |
| WIFI | | |
| Wi-Fi Radio | false | true |

550a

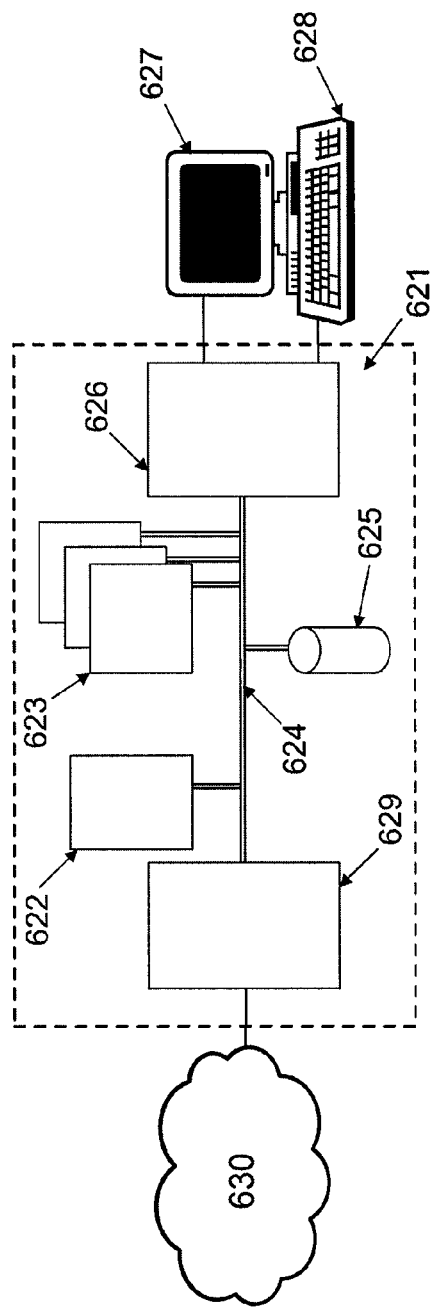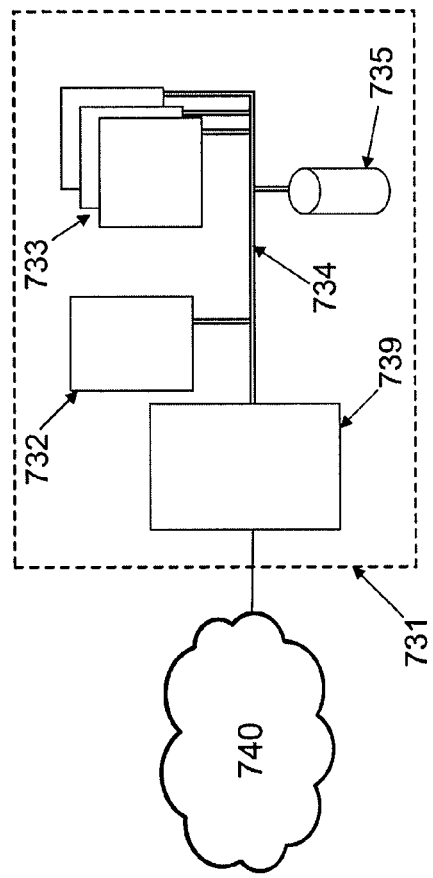

GRID-BASED USER INTERFACE TECHNIQUES FOR INTERACTING WITH NESTED HIERARCHICAL DATA STRUCTURES

BACKGROUND

1. Technical Field

The disclosed subject matter relates to techniques providing improved user interfaces for interacting with nested hierarchical data structures, such as those made available via the OMA DM for managing wireless mobile devices as discussed below.

2. Background

The Open Mobile Alliance (OMA) has defined Device Management (DM) mechanisms for performing over-the-air (OTA) access to mobile devices. See "OMA Device Management Protocol, Version 1.2," Open Mobile Alliance, OMA-TS-DM_Protocol-V1_2 (available via http://www.openmobilealliance.org) and "OMA Device Management Tree and Description," Open Mobile Alliance, OMA-TS-DMTND-V1_2_1-20080617-A (available via http://www.openmobilealliance.org), both of which are herein incorporated by reference in their entireties. One use of OMA DM is to provide Subscriber Device Management (SDM), whereby a customer service representative (CSR) for a mobile services provider is able to perform over-the-air (OTA) access of device state. Through SDM tools, CSRs are able to remotely resolve customer issues.

Each device that supports OMA DM contains a Management Tree which organizes all available configuration items in the device as a hierarchical tree structure, and is a mechanism by which a management client interacts with the mobile device, e.g. by storing and retrieving values from it and by manipulating the properties of it. A Management Object is a subtree of the Management Tree which is intended to be a (possibly singleton) collection of nodes which are related in some way. For example, the ./DevInfo nodes form a Management Object. A simple Management Object may consist of one single node. Each node within the tree structure can be uniquely addressed with a Uniform Resource Indicator (URI). By identifying nodes with URIs, nodes can be manipulated by management actions carried over the OMA DM protocol.

Although OMA DM defines a protocol and framework that enables OTA management of a wide variety of mobile devices, by design OMA DM does not impose particular requirements as to which Management Objects are provided. As a result, there is variation, across mobile device models and manufacturers, as to which particular Management Objects are available, the format of their data, and their locations throughout the OMA DM tree. An OMA DM Management Tree potentially contains hundreds of Management Objects. This is particularly true where a mobile device is configured to access multiple e-mail accounts and/or paired with multiple Bluetooth devices. The level of detail of an OMA DM, the distribution of the Management Objects throughout a hierarchical data structure, and the variation in the available Management Objects and their locations in the Management Tree across device models and manufacturers, often interfere with a CSR's goal of quick and efficient resolution of customer issues. The OMA DM data-structure is verbose, large, and hard to comprehend. Conventional tools for OMA DM management expose much of the hierarchical nature of the underlying data. Another conventional approach involves creating software customized for the unique OMA DM structures of individual mobile device models. If the provider services a large number of different models of mobile devices, then the provider must have a corresponding large number of customized software programs for CSR interfaces to the OMA DM structures of the various devices. Hence, the use of customized software imposes significant development and maintenance costs, as well as undesired overhead in integrating new products.

CSRs should be able to easily locate relative device information without resorting to Adhoc enumeration methods. CSRs should not be concerned with the underlying hierarchical arrangement information. Also, an effective mechanism for dealing with large lists of similar device settings is necessary.

SUMMARY

For example, it may be desirable to provide a simple yet comprehensive graphical user interface (GUI) for accessing the OMA DM state of a mobile device.

Transformation of the OMA DM hierarchical data structure into a grid format, as discussed below, provides a user interface which increases productivity and speed, and consequently customer satisfaction. By uniquely combining and utilizing visual aids and smartly processing and presenting the OMA DM data-structure, cognitive stress and time required for a CSR to locate an OMA DM device setting may be significantly reduced. The exemplary techniques are well suited to the data structures presented in an OMA DM, as Management Objects are presented in a consistent format repeated throughout a large number of nodes in the hierarchical data structure. Additionally, by providing a technique generally applicable with OMA DM data structures, technical efforts in integrating new mobile devices into the CSR workflow, in spite of variation in OMA DM structures, is minimized.

By use of the techniques described herein, operation expenses may be reduced by increasing call efficiency and reducing average hold time for customers seeking service. This improves customer satisfaction. Also, by providing an easy to use interface for CSR personnel for finding desired information, the techniques described herein can also improve job satisfaction for CSRs, resulting in reduced turnover.

The disclosed subject matter relates to a computer-implemented method for presenting a hierarchical data structure in a first grid. The method involves receiving the hierarchical data structure, which includes a number of nodes, each of which has a node content type identifier. The nodes include:
  a first node with a first node content type identifier value,
  a second leaf node, which is a child node of the first node, with a second node content type identifier value,
  a third leaf node, which is a child node of the first node, with a third node content type identifier value,
  a fourth node, which is a sibling node of the first node, with a fourth node content type identifier value,
  a fifth leaf node, which is a child node of the fourth node, with the second node content type identifier value, and
  a sixth leaf node, which is a child node of the fourth node, with the third node content type identifier value.
The method also involves populating positions of the first grid, the first grid including first, second, and third columns and first, second, and third rows, as follows:
  at the first column, second row: a value based on the first node content type identifier value,
  at the first column, third row: a value based on the fourth node content type identifier value, at the second column, first row: a value based on the second node content type identifier value, at the second column, second row: a value based on a value stored in the second leaf node, at the second column, third row: a value based on a value stored in the fifth leaf node, at the third column, first row: a value based on the third node content type identifier value, at the third column, second row: a value based on a value stored in the third leaf node, and at the third column, third row: a value based on a value stored in the sixth leaf node.

Other concepts relate to systems configured or programmed to implement a technique for presenting a hierarchical data structure in a grid arrangement, like that outlined above.

Still other concepts discussed below relate to software for implementing a technique for presenting a hierarchical data structure in a grid arrangement, like that discussed above. A software product or article of manufacture, in accord with this concept, includes at least one machine-readable medium and information carried by the medium. The information carried by the medium may be executable program code and/or data for implementing the relevant functions.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3B and 3C illustrate a resultant transformation of the second hierarchical data structure into two grids.

FIGS. 4B-4D illustrate a transformation of the third hierarchical data structure into three grids. FIG. 4E illustrates an alternative transformation of the third hierarchical data structure into one grid.

FIG. 5A illustrates a fourth hierarchical data structure, and FIG. 5B illustrates a transformation of the fourth hierarchical data structure into a grid.

FIG. 6 is a functional block diagram of a PC based implementation of computer system 621, and is illustrative of some embodiments of various programmed computer systems illustrated in the figures.

FIG. 7 is a functional block diagram of a general-purpose computer system 731, which may perform the functions of a server, and is illustrative of some embodiments of the programmed computer systems illustrated in the figures.

The drawings disclose a few example but not all embodiments of the user interfaces for interacting with nested hierarchical data structures. Other embodiments may be used in addition or instead. Details that may be apparent or unnecessary may be omitted to save space or for more effective illustration. Conversely, some embodiments may be practiced without all of the details that are disclosed.

DETAILED DESCRIPTION OF THE DISCLOSED SUBJECT MATTER

Figure 1:
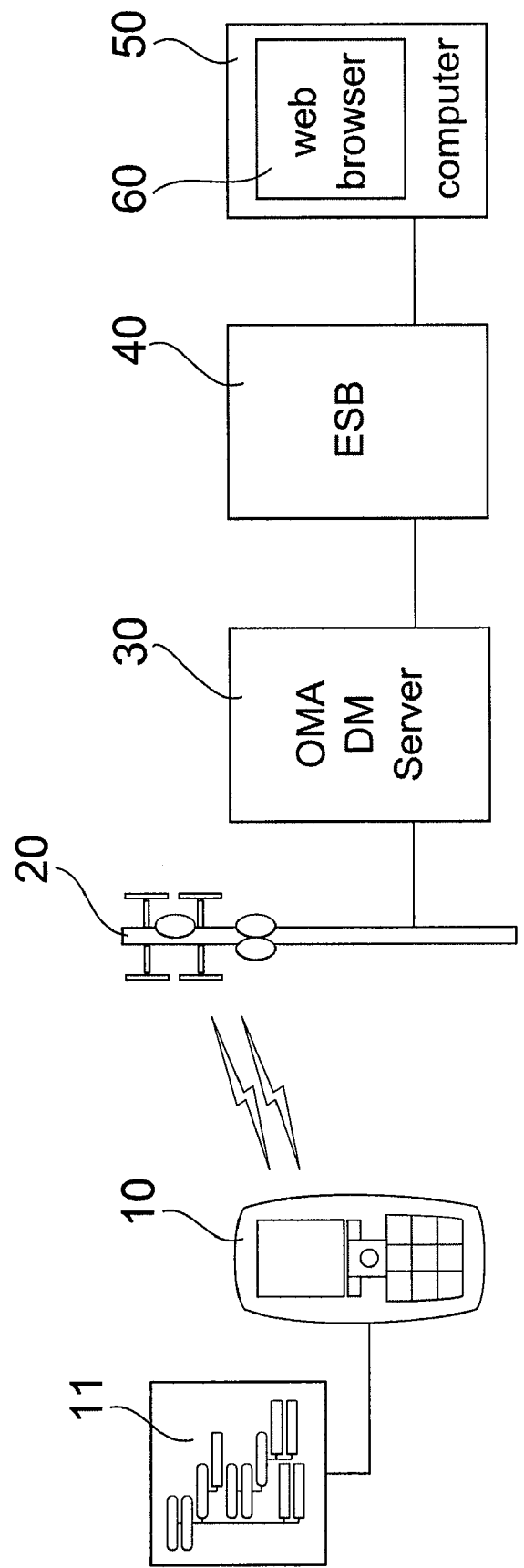
FIG. 1 illustrates an embodiment of the disclosed subject matter providing an example of interaction between mobile device 10 and web browser application 60.

FIG. 1 illustrates an embodiment of the disclosed subject matter providing an example of interaction between mobile device 10 and web browser application 60 used by a customer service representative (CSR). Mobile device 10 supports the OMA DM protocol. Via a wireless over-the-air (OTA) connection, base station 20 is in communication with wireless handset device 10. This wireless link provides a data communication link via which OMA DM server 30 is able to exchange messages with mobile device 10. By use of messages defined by the OMA DM protocol, OMA DM server 30 is able to, among other things, access the OMA DM Management Tree 11 provided by mobile device 10. Enterprise service bus (ESB) 40 communicates with OMA DM server 30, and provides an abstraction layer for various enterprise applications which wish to access the OMA DM Management Tree 11, whether for reading or writing. The layer of abstraction provided by ESB 40 insulates enterprise applications from implementation-specific details of OMA DM Server 30, which may change over time or from vendor to vendor. ESB 40 provides a request/response XML/SOAP interface for accessing the OMA DM Management Tree 11. Computer 50 executes, among other programs, a web browser application 60. Web browser application 60 executes a Rich Internet Application (RIA) implemented with ActionScript, HTML, and JavaScript technologies. The RIA is responsible for handling XML/SOAP request/response messages used for accessing OMA DM Management Tree 11 via ESB 40, and is also responsible for transforming retrieved hierarchical OMA DM data into a grid-based user interface for a user of the RIA, much as illustrated in FIGS. 2A to 5B.

Those skilled in the art would understand other techniques are within the skill of the art for realizing the disclosed subject matter, and that the above merely illustrates a specific illustrative embodiment of the disclosed subject matter. For example, although the embodiment discussed above transforms the OMA DM hierarchical data structure using the RIA executing under web browser application 60, in other embodiments the transformation may be performed outside of web browser application 60, such as on ESB 40 of an intermediate server system not illustrated in FIG. 1.

Figure 2A:
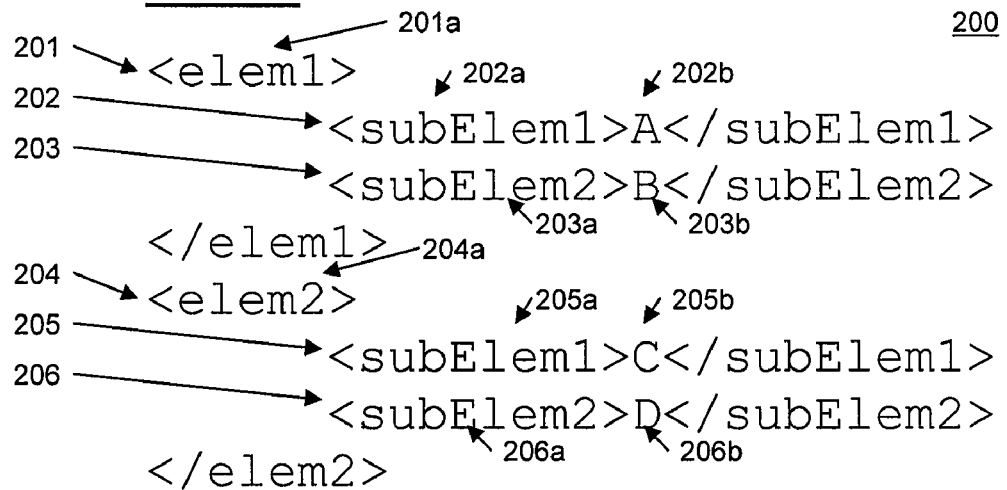
FIG. 2A illustrates a first hierarchical data structure.

FIG. 2A illustrates a portion 200 of an XML representation of a hierarchical data structure. Such a portion is seen in the XML/SOAP messages utilized by the RIA, as illustrated in FIG. 5A. In FIG. 2A, there are two sibling nodes 201 (with a node content type identifier value 201a of "elem1") and 204 (with a node content type identifier value 204a of "elem2"). Node 201 has two child nodes 202 (with a node content type identifier value 202a of "subElem1" and storing a value 202b of "A") and 203 (with a node content type identifier value 203a of "subElem2" and storing a value 203b of "B"). Node 204 has two child nodes 205 (with a node content type identifier value 205a of "subElem1" and storing a value 205b of "C") and 206 (with a node content type identifier value 206a of "subElem2" and storing a value 206b of "D"). Node content type identifier value 202a and node content type identifier value 205a have the same value of "subElem1," and node content type identifier value 203*a* and node content type identifier value 206*a* have the same value of "subElem2." Nodes 201 and 204 may each include additional child nodes, and are shown as each having a pair of child nodes to more simply illustrate the disclosed subject matter. Additionally, node 201 may have more than one sibling node. In such a case, the grid illustrated in FIG. 2B would possibly include additional rows, depending upon the content of the sibling nodes, however FIGS. 3A-3C illustrate an exception applicable when two sibling nodes share a common node content type identifier value.

Figure 2B:
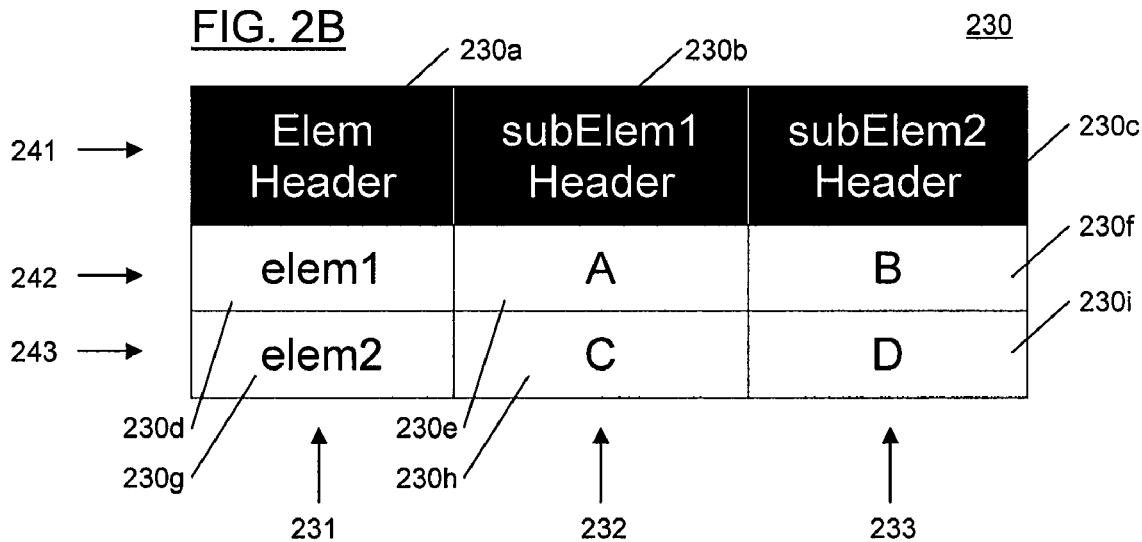
FIG. 2B illustrates a resultant transformation of the first hierarchical data structure into a grid.
Figure 3A:
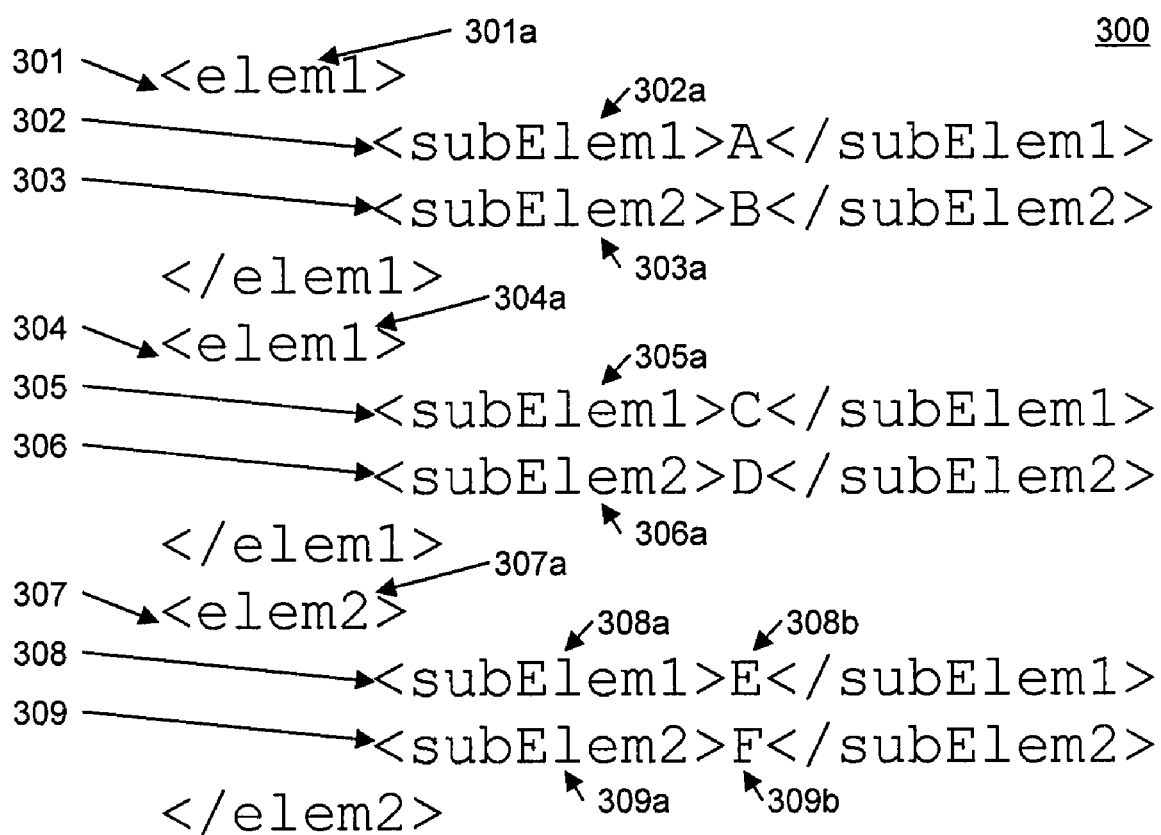
FIG. 3A illustrates a second hierarchical data structure.

FIG. 2B illustrates a result of transforming the data structure illustrated in FIG. 2A into a grid 230 used as a user interface element for accessing the contents of the hierarchical data structure in accordance with the disclosed subject matter. Grid 230 includes 3 columns 231, 232, and 233, and includes 3 rows 241, 242, and 243. Cells 230*a* to 230*i* are located at respective intersections of the above-mentioned columns and rows, as illustrated in FIG. 2B. Grid 230 may include additional rows or columns, but these are not illustrated in FIG. 2B to more simply illustrate the disclosed subject matter. Row 241, including cells 230*a*, 230*b*, and 230*c*, provides column headers for the data shown in the subsequent rows. Cell 230*b* is populated with text corresponding to the value in 202*a*/205*a*. For example, although the XML data uses the value "subElem1," a more user-friendly text value, such as "Current Value," may be used to more clearly convey the meaning of the data presented in grid 230. There are a number of mechanisms known in the art for identifying a text string based on a key/tag value. Cell 230*c* is populated with text corresponding to the value in 203*a*/206*a*, much in the same manner as discussed with respect to cell 230*a*.

Row 242, including cells 230*d*, 230*e*, and 230*f*, presents the data corresponding to node 201 and its child nodes 202 and 203. Cell 230*d* is populated with text corresponding to value 201*a*, much in the same manner as discussed with respect to cell 230*a*. In some embodiments, an additional child node (not illustrated), may be included which provides the text value to be displayed for node 201 in cell 230*d*. Cell 230*e* is populated with a value based on value 202*b* for node 202. In some instances, value 202*b* may be used directly. In other cases, a different text value may be provided for cell 230*e* based on value 202*b*. For example, value 202*b* might be an integral value representing a particular mode of operation for wireless handset device 10. Where the meaning of this integral value is not readily apparent, it may be convenient to substitute the integral value with a text label that is more readily understood. Cell 230*f* is populated with a value based on value 203*b* for node 203, much in the same manner as discussed with respect to cell 230*e*. Row 243, including cells 230*g*, 230*h*, and 230*i*, presents the data corresponding to node 204 and its child nodes 205 and 206, much in the same manner as discussed above with respect to row 242.

In some embodiments, where the height for the rows following column header row 241 exceeds the screen space allocated to grid 230, a scrollable area (not shown) may be provided containing the rows following column header row 241. This is also applicable to other grids illustrated in FIGS. 3B, 3C, and 4B-4E. For example, grid 490 illustrated in FIG. 4E, when it includes a large number of rows, may easily exceed the screen space allocated to grid 490. By not including column header row 241 in the scrollable area, the column headers may continue to remain visible at all times, to make the information displayed in the grid more readily understandable.

Although not illustrated in FIGS. 2A and 2B, nodes 201 and 204 may have additional child nodes for display in grid 230. For example, if two additional child nodes were provided to each of nodes 201 and 204 for display, grid 230 would include an additional two columns for displaying column headers and data corresponding to the node content type identifier values and stored values for the additional child nodes. In some embodiments, the RIA may be programmed to not display certain child nodes, typically based node content type identifier value. For example, node 201 could have a child node with a node content type identifier value of "Description," where the value stored in the node provides a "human readable" text string for display in cell 230*d*. In other examples, particular node content type identifier values may be "whitelisted" or "blacklisted" for purposes of display in grid 230. Also, if node 201 were to have additional sibling nodes for display, grid 230 would include additional rows for display of the data provided by the additional sibling nodes. In some embodiments, the RIA may also be programmed to not display certain sibling nodes, typically based node content type identifier value.

In some cases, a subnode may be omitted in the hierarchical data. For example, node 205 could be omitted from the data structure illustrated in FIG. 2A. This often occurs in OMA DM data, as there is typically a default value (often specified in another node) used by mobile device 10 for Management Objects to which a value has not been actively assigned. Grid 230 would still be populated as discussed above, with the exception of cell 230*h*, as there would be no available value 205*b*. In such a case, cell 230*h* could be, for example, populated with a blank, a default value provided by the RIA (e.g., "N/A"), or use value 206*b* (where, for example, column 232 corresponds to a "Current Value" and column 233 corresponds to a "Default Value"). Additionally, a visual indicator, such as a modified color, might be applied to cell 230*h* to indicate there is not assigned value.

By transforming the tree-like data structure 200 illustrated in FIG. 2A into grid 230 as illustrated in FIG. 2B, a user of the RIA is able to more quickly understand the retrieved contents of the OMA DB, versus the conventional approach in which a user FIG. 3A illustrates a second portion 300 of an XML representation of a hierarchical data structure. In contrast to FIG. 2A, nodes 301 and 304 have the same node content type identifier values 301*a* and 304*a*. The OMA DM allows such multiple instances of a node to occur. For example, a mobile device may be configured to access multiple e-mail accounts, each with respective configuration information. For each e-mail account, there will be node with a node content type identifier value designating the node as for e-mail account configuration data.

Nodes 301 to 306 are configured in much the same manner as nodes 201 to 206 in FIG. 2A, with the above-noted exception that node content type identifier values 301*a* and 304*a* have the same value "elem1." Nodes 301 and 304 have an additional sibling node 307 (with a node content type identifier value 307*a* of "elem2"). Node 307 has two child nodes 308 (with a node content type identifier value 308*a* of "subElem1" and storing a value 308*b* of "E") and 309 (with a node content type identifier value 309*a* of "subElem2" and storing a value 309*b* of "F"). Node content type identifier values 302*a*, 305*a*, and 308*a* have the same value of "subElem1," and node content type identifier values 303*a*, 306*a*, and 309*a* have the same value of "subElem2."

FIG. 3B illustrates a user interface resulting from transforming XML portion 300 that includes sibling nodes 301 and 304 with identical node content type identifier values.

Grid 360 includes 3 columns 361, 362, and 363, and includes 3 rows 371, 372, and 373. Cells 360a to 360i are located at respective intersections of the above-mentioned columns and rows, as illustrated in FIG. 3B. Grid 360 may include additional rows or columns, but these are not illustrated in FIG. 3B to more simply illustrate the disclosed subject matter. Row 371, including cells 360a, 360b, and 360c, provides column headers for the data shown in the subsequent rows. Cell 360b is populated with text corresponding to the value in 302a/305a/308a, much in the same manner as discussed with respect to cell 230a. Cell 360c is populated with text corresponding to the value in 303a/306a/309a, much in the same manner as discussed with respect to cell 230a.

Row 372, including cells 360d, 360e, and 360f, is related to nodes 301 and 304 with identical node content type identifier values. Rather than present the information relating to these nodes in grid 360, the information for nodes 301 and 304 is listed in a separate grid 330, which is illustrated in FIG. 3C. Cell 360d is populated with text corresponding to node content type identifier value 201a, much in the same manner as discussed with respect to cell 230a. Additionally, cell 360d is provided with a pointer or link to grid 330. In some embodiments, by performing a mouse click on cell 360d or a link provided therein, the "nested" grid 330, which ordinarily is not visible, is presented on the user interface along with an interface element, such as a button, for rendering grid 330 not visible again. Cells 360e and 360f are not populated with text. However, in some embodiments these cells may be rendered with a color or pattern that indicates they are unused. Row 373, including cells 360g, 360h, and 360i, presents the data corresponding to node 307 and its child nodes 308 and 309, much in the same manner as discussed above with respect to row 242.

FIG. 3C illustrates the result of transforming the hierarchical data in nodes 301 and 304 having the same node content type identifier value. Grid 330 is generated in much the same manner as grid 230 shown in FIG. 2B for nodes 201 and 204 in FIG. 2A. As noted above, cell 360d in grid 360 provides a pointer to grid 330. Although not illustrated in the drawings, if an additional sibling for node 301 were added with the same node content type identifier value as node 301, an additional row would be added to grid 330 listing the information contained therein.

Figure 4A:
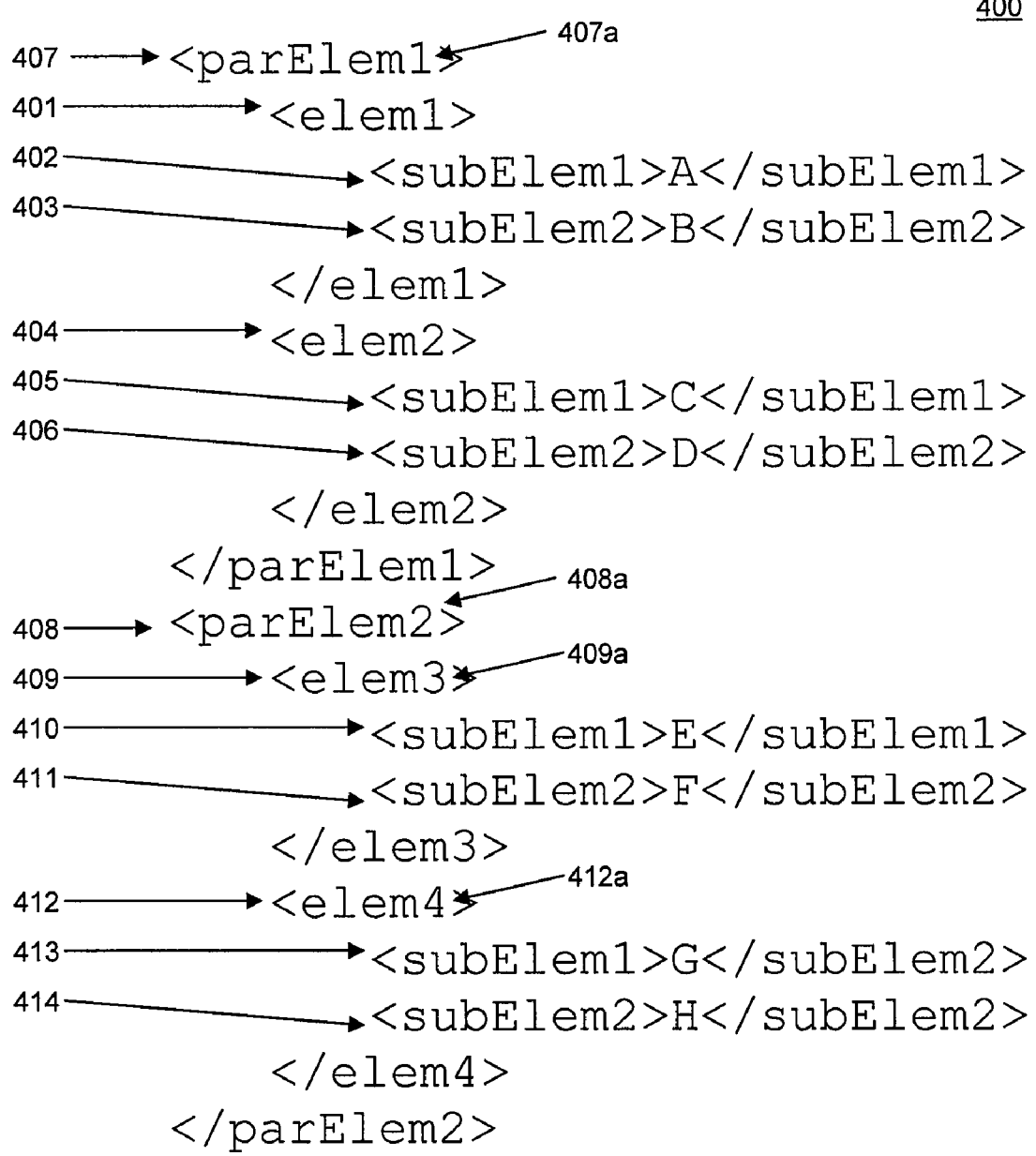
FIG. 4A illustrates a third hierarchical data structure.

FIG. 4A illustrates a third portion 400 of an XML representation of a hierarchical data structure. Nodes 401-406 are configured in the same manner as nodes 201-206 illustrated in FIG. 2A. Nodes 409-414 have a similar configuration to nodes 201-206 illustrated in FIG. 2A, with the exceptions that node 409 has a node content type identifier value 409a of "elem3," node 412 has a node content type identifier value 412a of "elem4," and leaf nodes 410, 411, 413, and 414 store different values than nodes 202, 203, 205, and 206. As is discussed below, the data corresponding to nodes 401 and 404 is made available via nested grid 430, and the data corresponding to nodes 409 and 412 is made available via nested grid 450. FIG. 4A is distinguished, in part, from FIG. 2A in that node 401 has a parent node 407 (with a node content type identifier value 407a of "parElem1"). Further, node 407 has a sibling node 408 (with a node content type identifier value 408a of "parElem2").

FIG. 4B illustrates a user interface resulting from transforming XML portion 400 including parent nodes 407 and 408. Grid 470 includes one column and 3 rows 471, 472, and 473. Cells 470a, 470b, and 470c are located at respective intersections of the above-mentioned column and rows, as illustrated in FIG. 4B. Grid 470 may include additional rows or columns, but these are not illustrated in FIG. 4B to more simply illustrate the disclosed subject matter. Cell 470a is populated with a column header. Much as described above with respect to cell 360d in FIG. 3B, rather than present the information relating to nodes 401 and 404 in grid 470, the information relating to nodes 401 and 404, which are the children of node 407, is listed in a separate grid 430, which is illustrated in FIG. 4C. Cell 470b is populated with text corresponding to node content type identifier value 407a, much in the same manner as discussed with respect to cell 230a. Additionally, cell 470b is provided with a pointer or link to grid 430. Much as described with respect to cell 360d, in some embodiments, by performing a mouse click on cell 470b or a link provided therein, the "nested" grid 430, which ordinarily is not visible, is presented on the user interface along with an interface element, such as a button, for rendering grid 430 not visible again. Cell 470c is populated in much the same way as cell 470b, however it points to nested grid 450 populated with information relating to child nodes 409 and 412 of node 408, and cell 470c is populated with text corresponding to node content type identifier value 408a.

As discussed above, FIGS. 4C and 4D illustrate "nested" grids 430 and 450, which are populated with data corresponding to nodes 407 and 408, respectively. Each of grids 430 and 450 is populated in much the same way described with respect to grids 230 and 330 illustrated in FIGS. 2B and 3C.

FIG. 4E illustrates an alternative to the set of three grids illustrated in FIGS. 4B-4D for transforming the hierarchical data to a grid-based user interface. FIG. 4E illustrates use of a single grid 480, populated with information corresponding to all of the nodes illustrated in FIG. 4A. Grid 480 includes 3 columns 481, 482, and 483 and 7 rows 491-497, as illustrated in FIG. 4E. The cells of top row 491 are populated in the same manner as 441 and 461 in FIGS. 4C and 4D, providing column headers. Row 492, typically in the cell located in column 481, is populated with text corresponding to the node content type identifier value 407a, providing a visual indication that the data shown in rows 493 and 494 relates to subnodes of node 407. In some embodiments, the populated text is provided with a different color than the text in rows 493 and 494, and/or a different background color is used for the cells in row 492, in order to enhance this visual indication. Rows 493 and 494 are populated in the same manner as rows 442 and 443 of FIG. 4C. Row 495 is populated with text corresponding to the node content type identifier value 408a, much in the same manner described above with respect to row 492. Rows 496 and 497 are populated in the same manner as rows 462 and 463 of FIG. 4D.

FIGS. 5A-1 to 5A-3 illustrate a response message 500 containing OMA DM hierarchical data retrieved by the RIA via XML/SOAP. This particular response message 500 contains device profile and WiFi information obtained from mobile 10, as indicated by the nodes with the node content type identifier values of "DEVICE-PROFILE" (node 501) and "WIFI" (node 502). FIG. 5B illustrates a transformation, resulting in a grid-based user interface similar to grid 480 illustrated in FIG. 4E, of the OMA DM hierarchical data into a grid-based user interface. From FIG. 5B, it can be seen that values for only 2 of the 5 leaf nodes provided for each of the items are displayed in grid 550: (1) the leaf nodes with a node content type identifier value of "Actual" (corresponding to the middle column with column header "Actual Value"), and (2) the leaf nodes with a node content type identifier value of "Expected" (corresponding to the right column with column header "Expected Value"). The leaf nodes with node content type identifier values of "URI" and "Source" are not used in populating grid 550. However, this information may be made available otherwise via the RIA.

The leaf nodes with a node content type identifier value of "ReadOnly" do, however, have an effect on the operation of grid 550 as a user interface element. FIGS. 5A-2 illustrates a node 503 with a node content type identifier value of "DP-GPS-LOC" which was a child leaf node 504 with a node content type identifier value of "ReadOnly" storing a value of "NO". This indicates that this value may be modified via the OMA DM protocol. As can be seen in FIG. 5B, cell 550a corresponding to the sibling "Actual" node 505 includes an additional box and the text is shown in bold. This indicates to the user that the value may be modified via grid 550. Other visual indicators, including, but not limited to, a different background color or a graphical icon, can be used. If the user changes the value in this cell, RIA generates the necessary SOAP/XML message(s) to modify the changed value. In some embodiments, the message may only specify the nodes to be modified. In other embodiments, the RIA may regenerate the entire OMA DM XML data structure, replacing any modified values, and submit the entire OMA DM XML data structure as part of the request message. In some embodiments, updates are not performed until the user clicks on a update button provided in the user interface. Benefits of this approach include: (1) less likelihood of inadvertent changes to the OMA DM on mobile device 10, and (2) aggregation of changes into a single operation, which may be more efficient and/or avoid inconsistent values among of within OMA DM Management Objects on mobile device 10.

FIG. 6 is a functional block diagram of a PC based implementation of computer system 621, and is illustrative of some embodiments of various programmed computer systems illustrated in the figures described above. The exemplary system 621 contains a central processing unit (CPU) 622, memories 623 and an interconnect bus 624. The CPU 622 may contain a single microprocessor (e.g. an x86 microprocessor), or it may contain a plurality of microprocessors for configuring the computer system 621 as a multi-processor system. The memories 623 include a main memory, such as a dynamic random access memory (DRAM), as well as a read only memory, such as a PROM, an EPROM, a FLASH-EPROM, or the like. The system 621 also includes mass storage devices such as various disk drives, tape drives, etc. The main memory typically includes dynamic random access memory (DRAM) and high-speed cache memory. In operation, the main memory stores at least portions of instructions and data for execution by the CPU 622.

The mass storage may include one or more magnetic disk or tape drives or optical disk drives, for storing data and instructions for use by CPU 622. For a user PC, for example, at least one mass storage system 625 in the form of a disk drive or tape drive, stores the operating system and application software as well as data, such as received messages and documents. The mass storage 625 within the computer system 621 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 621.

The system 621 also includes one or more input/output interfaces for communications, shown by way of example as an interface 629 for data communications via a network 830. The interface 629 may be a modem, an Ethernet card or any other appropriate data communications device, for digital communications of various types via network 630. The physical communication links may be optical, wired, or wireless (e.g., via satellite, cellular, or WLAN network).

The computer system 621 may further include appropriate input/output ports 826 for interconnection with a display 627 and a keyboard 628 serving as the respective user interface. For example, the computer may include a graphics subsystem to drive the output display 627. The output display 627 may include a cathode ray tube (CRT) display or liquid crystal display (LCD). The input control devices for such an implementation of the system 621 would include the keyboard 628 for inputting alphanumeric and other key information. The input control devices for the system may further include a cursor control device (not shown), such as a mouse, a trackball, stylus, or cursor direction keys. The links of the peripherals 627, 628 to the system 621 may be wired connections or use wireless communications.

Each computer system 621 runs a variety of applications programs and stores data, enabling one or more interactions via the user interface, provided through elements such as 627 and 628, and/or over network 630 to implement the desired processing for the disclosed subject matter.

FIG. 7 is a functional block diagram of a general-purpose computer system 731, which may perform the functions of a server, and is illustrative of some embodiments of the programmed computer systems illustrated in the figures described above.

The exemplary computer system 731 contains a central processing unit (CPU) 732, memories 733 and an interconnect bus 734. The CPU 732 may contain a single microprocessor, or may contain a plurality of microprocessors for configuring the computer system 732 as a multi-processor system. Although not illustrated as such, computer system 731 may comprise a plurality of discrete computer systems, interconnected via data network 740. The memories 733 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 732.

The mass storage may include one or more magnetic disk or tape drives or optical disk drives, for storing data and instructions for use by CPU 732. At least one mass storage system 735, preferably in the form of a disk drive or tape drive, stores the database used for the disclosed subject matter. The mass storage 735 may also include one or more drives for various portable media, such as a floppy disk, a compact disc read only memory (CD-ROM), or an integrated circuit non-volatile memory adapter (e.g., a PC-MCIA or USB adapter) to input and output data and code to and from the computer system 731.

The system 731 also includes one or more input/output interfaces for communications, shown by way of example as an interface 739 for data communications via network 740. The interface 739 may be a modem, an Ethernet card or any other appropriate data communications device. To provide the disclosed techniques to a large number of users, the interface 739 preferably provides a relatively high-speed link to network 740 The physical communication link may be optical, wired, or wireless (e.g., via satellite, cellular, or WLAN network). Alternatively, the computer system may comprise a mainframe or other type of host computer system.

Although not shown, the system 731 may further include appropriate input/output ports for interconnection with a local display and a keyboard or the like serving as a local user interface. Alternatively, the server operations personnel may interact with the system 731 for control and programming of the system from remote terminal devices via network 740.

The computer system 731 runs a variety of applications programs and stores the database. Those skilled in the art will recognize that the computer system 731 may run other programs and/or host other database services. As such, the system 731 need not sit idle while waiting for functions preformed by the disclosed techniques. Also, the system 731 may be implemented as a single computer system or as a distributed system having multiple appearances at different nodes on network 740.

The components contained in the computer systems 721 and 731 are those typically found in general purpose computer systems used as servers, workstations, personal computers, network terminals, and the like. In fact, these components are intended to represent a broad category of such computer components that are well known in the art.

Aspects of the techniques outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the white point correction, etc. as shown and described herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or other programmable device can read programming code and/or data. Many of these forms of computer or machine readable media may be involved in carrying one or more sequences of one or more instructions to a processor for execution.

Certain aspects of the user interface for interacting with nested hierarchical data structures relate to software elements, such as executable code and/or database software used to implement the various disclosed functions. These functions may reside on different physical systems, linked by local or wide area communications networks.

At different times all or portions of the executable code or database for any or all of these software elements may reside in storage media or be carried by electromagnetic media. The various data components as well as other files relating to the disclosed subject matter may reside in or be transported via a variety of different media. Physical media include the memory of the computer processing systems 621, 731, such as various semiconductor memories, tape drives, disc drives and the like of general-purpose computer systems. All or portions of the software may at times be communicated through via a network or various other telecommunication networks. Such communications, for example, may be to load the software from another computer (not shown) into a server or into another network element. Thus, another type of media that may bear the software elements includes optical, electrical and electromagnetic waves, such as used across physical interfaces between local devices, through wired and optical landline networks and over various air-links.

Hence, operations described above may be carried out by execution of software, firmware, or microcode operating on a router or computer of any type. Additionally, code for implementing such operations may be in the form of computer instruction in any form (e.g., source code, object code, interpreted code, etc.) stored in or carried by any computer or machine readable medium.

At different times all or portions of the executable code for any or all of these programming elements may reside in storage media or be carried by electromagnetic media. Storage media include the memory of the wireless controller or of memory or other storage elements of computer processing systems that may supply programming to the wireless controller, such as various semiconductor memories, tape drives, disc drives and the like. All or portions of the software may at times be communicated through the Internet or various other telecommunication networks. Such communications, for example, may be to load the software or an update thereof from a computer (not shown) into the wireless controller. Thus, another type of media that may bear the software elements includes optical, electrical and electromagnetic waves, such as used across physical interfaces between local devices, through wired and optical landline networks and over various air-links.

Individuals and organizations might agree to utilize only certain XML tags for interoperability reasons. A collection of such tags that was agreed upon is referred to an XML application. Examples of such are HTML or OMA DM standard that set forth collection of XML tags that either describes the layout of a web page as in the case of HTML or aspects of mobile device management and predefined settings as in the case of OMA DM.

Figure 8:
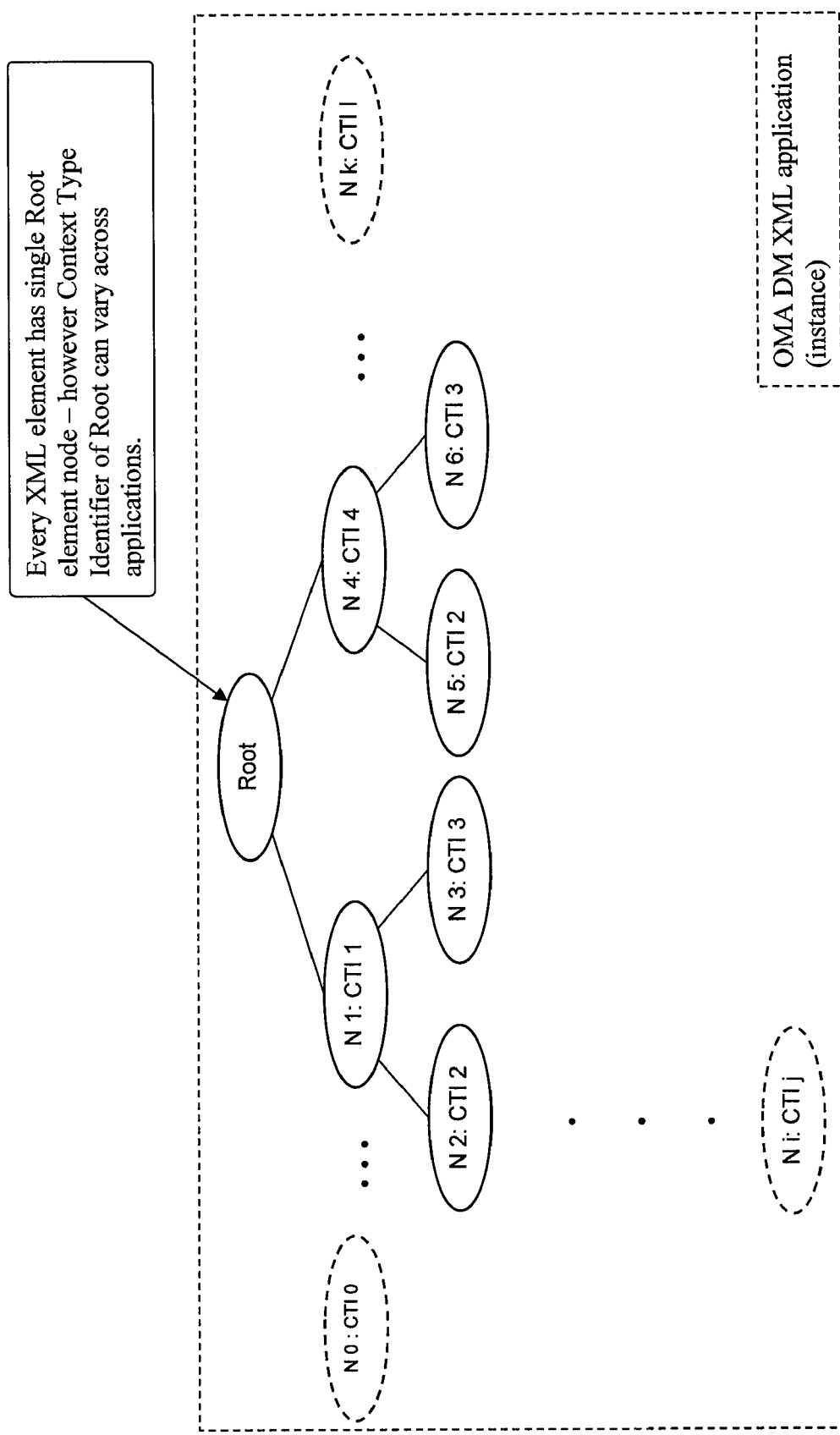
FIG. 8 illustrates the OMA DM as an instance of an XML application.

As illustrated in FIG. 8, the data structure described in this disclosure is derived from an OMA-DM-like XML document. Although techniques described in this disclosure are applied to a specific XML application, they can easily be generalized to include any other application that contains similar XML constructs such as lists and nested structures transformation of which is described in this disclosure.

Further as illustrated in the above figure, the XML that is transformed does not have to be constrained by the number of elements in the corresponding tree. Nor is the tree depth, the longest path from root node to the leaf node, number or siblings, or children is a constraint. The disclosed techniques might be applied recursively with minor modifications or as is to any combination of nodes found in a well-formed XML documents.

In this disclosure there are described only the preferred embodiments of the disclosed subject matter and but a few examples of its versatility. It is to be understood that the disclosed subject matter is capable of use in various other combinations and environments and is capable of changes or modifications within the scope of the inventive concepts expressed herein. Thus, for example, those skilled in the art will recognize, or be able to ascertain, using no more than routine experimentation, numerous equivalents to the specific substances and procedures described herein. Such equivalents are considered to be within the scope of the disclosed subject matter. Additionally, the scope of the inventive concepts includes both combinations and subcombinations of the various features described hereinabove, as well as variations and modifications thereof which would occur to persons skilled in the art upon reading the foregoing description.

The previous description and figures are provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public.

What is claimed is:

1. A computer-implemented method for presenting a hierarchical data structure in a first grid, the method comprising:
   receiving the hierarchical data structure, the hierarchical data structure including a plurality of nodes each including a node content type identifier, the plurality of nodes comprising:
   a first node with a first node content type identifier value,
   a second leaf node, which is a child node of the first node, with a second node content type identifier value,
   a third leaf node, which is a child node of the first node, with a third node content type identifier value,
   a fourth node, which is a sibling node of the first node, with a fourth node content type identifier value,
   a fifth leaf node, which is a child node of the fourth node, with the second node content type identifier value,
   a sixth leaf node, which is a child node of the fourth node, with the third node content type identifier value,
   a seventh node, which is a parent node of the first and fourth nodes, with a fifth node content type identifier value,
   an eighth node, which is a sibling of the parent node, with a sixth node content type identifier value,
   a ninth node, which is a child of the eighth node, with a seventh node content type identifier value,
   a tenth leaf node, which is a child node of the first node, with the second node content type identifier value,
   a eleventh leaf node, which is a child node of the first node, with the third node content type identifier value,
   a twelfth node, which is a child of the eighth node, with an eighth node content type identifier value,
   a thirteenth leaf node, which is a child node of the fourth node, with the second node content type identifier value, and
   a fourteenth leaf node, which is a child node of the fourth node, with the third node content type identifier value;
   populating positions of the first grid, the first grid comprising first, second, and third columns and first, second, and third rows, as follows:
   at the first column, second row: a value based on the first node content type identifier value,
   at the first column, third row: a value based on the fourth node content type identifier value,
   at the second column, first row: a value based on the second node content type identifier value,
   at the second column, second row: a value based on a value stored in the second leaf node,
   at the second column, third row: a value based on a value stored in the fifth leaf node,
   at the third column, first row: a value based on the third node content type identifier value,
   at the third column, second row: a value based on a value stored in the third leaf node, and
   at the third column, third row: a value based on a value stored in the sixth leaf node;
   populating positions of a second grid comprising fourth, fifth, and sixth columns and fourth, fifth, and sixth rows such that the fourth column contains values based on the seventh and eighth node content type identifier values, the fifth column contains a value based on the second node content type identifier value and values based on values stored in the tenth and thirteenth leaf nodes, and the sixth column contains a value based on the third node content type identifier value and values based on values stored in the eleventh and fourteenth leaf nodes; and
   populating positions of a third grid containing values based on the eighth and ninth content type identifier values and links to the first and second grids, wherein
   the second node content type identifier value is not the same as the third node content type identifier value; and
   the first row is positioned above the second and third rows.

2. The computer-implemented method of claim 1, wherein:
   the first node content type identifier value is the same as the fourth node content type identifier value;
   the plurality of nodes further comprises:
   a fifteenth node, which is a sibling node of the first node, with a ninth node content type identifier value,
   a sixteenth leaf node, which is a child node of the fifteenth node, with the second node content type identifier value, and
   a tenth leaf node, which is a child node of the fifteenth node, with the third node content type identifier value,
   the method further comprises populating positions of a fourth grid, the fourth grid comprising seventh, eighth and ninth columns and seventh, eighth and ninth rows, as follows:
   at the seventh column, eighth row: a value based on the first node content type identifier value and a link to the first grid,
   at the seventh column, ninth row: a value based on the fifth node content type identifier value,
   at the eighth column, seventh row: a value based on the second node content type identifier value,
   at the eighth column, ninth row: a value based on a value stored in the eighth leaf node, at the ninth column, seventh row: a value based on the third node content type identifier value, and at the ninth column, third row: a value based on a value stored in the tenth leaf node; wherein the seventh row is positioned above the eighth and ninth rows.

3. The computer-implemented method of claim 1, wherein the second grid comprises:

at the fourth column, fifth row: the value based on the seventh node content type identifier value, at the fourth column, sixth row: the value based on the eighth node content type identifier value, at the fifth column, fourth row: the value based on the second node content type identifier value, at the fifth column, fifth row: the value based on a value stored in the tenth leaf node, at the fifth column, sixth row: the value based on a value stored in the thirteenth leaf node, at the sixth column, fourth row: the value based on the third node content type identifier value, at the sixth column, fifth row: the value based on a value stored in the eleventh leaf node, and at the sixth column, sixth row: the value based on a value stored in the fourteenth leaf node; and the fifth node content type identifier value is not the same as the sixth node content type identifier value; and the fourth row is positioned above the fifth and sixth rows.

4. The computer-implemented method of claim 1, wherein the plurality of nodes further comprises:

a fifteenth node, which is the parent node of the first and fourth nodes, with a ninth node content type identifier value, a sixteenth node, which is a sibling of the fifteenth node, with a tenth node content type identifier value, a seventeenth node, which is a child of the sixteenth node, with an eleventh node content type identifier value, an eighteenth leaf node, which is a child node of the first node, with the second node content type identifier value, a nineteenth leaf node, which is a child node of the first node, with the third node content type identifier value, a twentieth node, which is a child of the sixteenth node, with a twelfth node content type identifier value, a twenty-first leaf node, which is a child node of the fourth node, with the second node content type identifier value, and a twenty-second leaf node, which is a child node of the fourth node, with the third node content type identifier value;

the first grid further comprises seventh, eighth, ninth and tenth rows;

the seventh row is positioned below the first row and above the second and third rows;

the eighth row is positioned below the second and third rows and above the ninth and tenth rows; and the method further comprises populating positions of the first grid as follows:

the seventh row: a value based on the ninth node content type identifier value, the eighth row: a value based on the tenth node content type identifier value, at the first column, ninth row: a value based on the fifteenth node content type identifier value, at the first column, tenth row: a value based on the sixteenth node content type identifier value, at the second column, ninth row: a value based on a value stored in the eighteenth leaf node, at the second column, tenth row: a value based on a value stored in the twenty-first leaf node, at the third column, ninth row: a value based on a value stored in the nineteenth leaf node, and at the third column, tenth row: a value based on a value stored in the fourteenth twenty-second leaf node.

5. The computer-implemented method of claim 1, wherein the plurality of nodes further comprises:

a fifteenth leaf node, which is a child node of the first node, indicating that the value stored in the second leaf node may be modified; and the method further comprises:

setting the first grid at the second column, second row to be editable, providing a visual indicator that the first grid at the second column, second row is editable, receiving user-entered data into the first grid at the second column, second row, and updating the contents of the second leaf node in response to the receiving of the user-entered data.

6. The computer-implemented method of claim 1, wherein the receiving and populating are performed by a web browser application;

the hierarchical data structure is received in XML format;

the method further comprises displaying the first grid in a graphical user interface provided by the web browser application.

7. The computer-implemented method of claim 1, wherein the plurality of nodes further comprises:

a fifteenth leaf node, which is a child node of the first node, storing a text value corresponding to the first node content type identifier value; and the method further comprises populating the first column, second row of the first grid with the text value.

8. The computer-implemented method of claim 1, further comprising:

storing the first grid in a storage device of a computer implementing the method; and presenting the first grid to a user, via a user interface of the computer.

9. A programmed computer system comprising:

a programmable computer programmed to execute a method for presenting a hierarchical data structure in a first grid, the method comprising:

receiving the hierarchical data structure, the hierarchical data structure including a plurality of nodes each including a node content type identifier, the plurality of nodes comprising:

a first node with a first node content type identifier value, a second leaf node, which is a child node of the first node, with a second node content type identifier value, a third leaf node, which is a child node of the first node, with a third node content type identifier value, a fourth node, which is a sibling node of the first node, with a fourth node content type identifier value, a fifth leaf node, which is a child node of the fourth node, with the second node content type identifier value, a sixth leaf node, which is a child node of the fourth node, with the third node content type identifier value, a seventh node, which is a parent node of the first and fourth nodes, with a fifth node content type identifier value, an eighth node, which is a sibling of the parent node, with a sixth node content type identifier value, a ninth node, which is a child of the eighth node, with a seventh node content type identifier value, a tenth leaf node, which is a child node of the first node, with the second node content type identifier value,
a eleventh leaf node, which is a child node of the first node, with the third node content type identifier value,
a twelfth node, which is a child of the eighth node, with an eighth node content type identifier value,
a thirteenth leaf node, which is a child node of the fourth node, with the second node content type identifier value, and
a fourteenth leaf node, which is a child node of the fourth node, with the third node content type identifier value;
populating positions of the first grid, the first grid comprising first, second, and third columns and first, second, and third rows, as follows:
at the first column, second row: a value based on the first node content type identifier value,
at the first column, third row: a value based on the fourth node content type identifier value,
at the second column, first row: a value based on the second node content type identifier value,
at the second column, second row: a value based on a value stored in the second leaf node,
at the second column, third row: a value based on a value stored in the fifth leaf node,
at the third column, first row: a value based on the third node content type identifier value,
at the third column, second row: a value based on a value stored in the third leaf node, and
at the third column, third row: a value based on a value stored in the sixth leaf node;
populating positions of a second grid comprising fourth, fifth, and sixth columns and fourth, fifth, and sixth rows such that the fourth column contains values based on the seventh and eighth node content type identifier values, the fifth column contains a value based on the second node content type identifier value and values based on values stored in the tenth and thirteenth leaf nodes, and the sixth column contains a value based on the third node content type identifier value and values based on values stored in the eleventh and fourteenth leaf nodes; and
populating positions of a third grid containing values based on the eighth and ninth content type identifier values and links to the first and second grids, wherein
the second node content type identifier value is not the same as the third node content type identifier value; and
the first row is positioned above the second and third rows.

10. A tangible non-transitory computer-readable storage medium comprising instructions which, when executed by a computer, cause the computer to perform a method for presenting a hierarchical data structure in a first grid, the method comprising:
receiving the hierarchical data structure, the hierarchical data structure including a plurality of nodes each including a node content type identifier, the plurality of nodes comprising:
a first node with a first node content type identifier value,
a second leaf node, which is a child node of the first node, with a second node content type identifier value,
a third leaf node, which is a child node of the first node, with a third node content type identifier value,
a fourth node, which is a sibling node of the first node, with a fourth node content type identifier value,
a fifth leaf node, which is a child node of the fourth node, with the second node content type identifier value,
a sixth leaf node, which is a child node of the fourth node, with the third node content type identifier value,
a seventh node, which is a parent node of the first and fourth nodes, with a fifth node content type identifier value,
an eighth node, which is a sibling of the parent node, with a sixth node content type identifier value,
a ninth node, which is a child of the eighth node, with a seventh node content type identifier value,
a tenth leaf node, which is a child node of the first node, with the second node content type identifier value,
a eleventh leaf node, which is a child node of the first node, with the third node content type identifier value,
a twelfth node, which is a child of the eighth node, with an eighth node content type identifier value,
a thirteenth leaf node, which is a child node of the fourth node, with the second node content type identifier value, and
a fourteenth leaf node, which is a child node of the fourth node, with the third node content type identifier value;
populating positions of the first grid, the first grid comprising first, second, and third columns and first, second, and third rows, as follows:
at the first column, second row: a value based on the first node content type identifier value,
at the first column, third row: a value based on the fourth node content type identifier value,
at the second column, first row: a value based on the second node content type identifier value,
at the second column, second row: a value based on a value stored in the second leaf node,
at the second column, third row: a value based on a value stored in the fifth leaf node,
at the third column, first row: a value based on the third node content type identifier value,
at the third column, second row: a value based on a value stored in the third leaf node, and
at the third column, third row: a value based on a value stored in the sixth leaf node;
populating positions of a second grid comprising fourth, fifth, and sixth columns and fourth, fifth, and sixth rows such that the fourth column contains values based on the seventh and eighth node content type identifier values, the fifth column contains a value based on the second node content type identifier value and values based on values stored in the tenth and thirteenth leaf nodes, and the sixth column contains a value based on the third node content type identifier value and values based on values stored in the eleventh and fourteenth leaf nodes; and
populating positions of a third grid containing values based on the eighth and ninth content type identifier values and links to the first and second grids, wherein
the second node content type identifier value is not the same as the third node content type identifier value; and
the first row is positioned above the second and third rows.

11. A computer-implemented method for presenting a hierarchical data structure in a first grid, the method comprising:
receiving the hierarchical data structure from a mobile device, the hierarchical data structure relating to management objects for configuration of the mobile device and including a plurality of nodes each including a node content type identifier, the plurality of nodes comprising:
a first node with a first node content type identifier value,
a second leaf node, which is a child node of the first node, with a second node content type identifier value,
a third leaf node, which is a child node of the first node, with a third node content type identifier value, a fourth node, which is a sibling node of the first node, with a fourth node content type identifier value,
a fifth leaf node, which is a child node of the fourth node, with the second node content type identifier value,
a sixth leaf node, which is a child node of the fourth node, with the third node content type identifier value,
a seventh node, which is a parent node of the first and fourth nodes, with a fifth node content type identifier value,
an eighth node, which is a sibling of the parent node, with a sixth node content type identifier value,
a ninth node, which is a child of the eighth node, with a seventh node content type identifier value,
a tenth leaf node, which is a child node of the first node, with the second node content type identifier value,
a eleventh leaf node, which is a child node of the first node, with the third node content type identifier value,
a twelfth node, which is a child of the eighth node, with an eighth node content type identifier value,
a thirteenth leaf node, which is a child node of the fourth node, with the second node content type identifier value, and
a fourteenth leaf node, which is a child node of the fourth node, with the third node content type identifier value;
populating positions of the first grid, the first grid comprising first, second, and third columns and first, second, and third rows, as follows:
at the first column, second row: a value based on the first node content type identifier value,
at the first column, third row: a value based on the fourth node content type identifier value,
at the second column, first row: a value based on the second node content type identifier value,
at the second column, second row: a value based on a value stored in the second leaf node,
at the second column, third row: a value based on a value stored in the fifth leaf node,
at the third column, first row: a value based on the third node content type identifier value,
at the third column, second row: a value based on a value stored in the third leaf node, and
at the third column, third row: a value based on a value stored in the sixth leaf node;
populating positions of a second grid comprising fourth, fifth, and sixth columns and fourth, fifth, and sixth rows such that the fourth column contains values based on the seventh and eighth node content type identifier values, the fifth column contains a value based on the second node content type identifier value and values based on values stored in the tenth and thirteenth leaf nodes, and the sixth column contains a value based on the third node content type identifier value and values based on values stored in the eleventh and fourteenth leaf nodes; and
populating positions of a third grid containing values based on the eighth and ninth content type identifier values and links to the first and second grids, wherein
the second node content type identifier value is not the same as the third node content type identifier value; and
the first row is positioned above the second and third rows.

12. The computer-implemented method of claim 11, wherein:
the first node content type identifier value is the same as the fourth node content type identifier value;
the plurality of nodes further comprises:
a fifteenth node, which is a sibling node of the first node, with a ninth node content type identifier value,
a sixteenth leaf node, which is a child node of the fifteenth node, with the second node content type identifier value, and
a tenth leaf node, which is a child node of the fifteenth node, with the third node content type identifier value,
the method further comprises populating positions of a fourth grid, the fourth grid comprising seventh, eighth and ninth columns and seventh, eighth and ninth rows, as follows:
at the seventh column, eighth row: a value based on the first node content type identifier value and a link to the first grid,
at the seventh column, ninth row: a value based on the fifth node content type identifier value,
at the eighth column, seventh row: a value based on the second node content type identifier value,
at the eighth column, ninth row: a value based on a value stored in the eighth leaf node,
at the ninth column, seventh row: a value based on the third node content type identifier value, and
at the ninth column, third row: a value based on a value stored in the tenth leaf node; wherein
the seventh row is positioned above the eighth and ninth rows.

13. The computer-implemented method of claim 11, wherein the second grid comprises:
at the fourth column, fifth row: the value based on the seventh node content type identifier value,
at the fourth column, sixth row: the value based on the eighth node content type identifier value,
at the fifth column, fourth row: the value based on the second node content type identifier value,
at the fifth column, fifth row: the value based on a value stored in the tenth leaf node,
at the fifth column, sixth row: the value based on a value stored in the thirteenth leaf node,
at the sixth column, fourth row: the value based on the third node content type identifier value,
at the sixth column, fifth row: the value based on a value stored in the eleventh leaf node, and
at the sixth column, sixth row: the value based on a value stored in the fourteenth leaf node; and
the fifth node content type identifier value is not the same as the sixth node content type identifier value; and
the fourth row is positioned above the fifth and sixth rows.

14. The computer-implemented method of claim 11, wherein the plurality of nodes further comprises:
a fifteenth node, which is the parent node of the first and fourth nodes, with a ninth node content type identifier value,
a sixteenth node, which is a sibling of the fifteenth node, with a tenth node content type identifier value,
a seventeenth node, which is a child of the sixteenth node, with an eleventh node content type identifier value,
an eighteenth leaf node, which is a child node of the first node, with the second node content type identifier value,
a nineteenth leaf node, which is a child node of the first node, with the third node content type identifier value,
a twentieth node, which is a child of the sixteenth node, with a twelfth node content type identifier value,
a twenty-first leaf node, which is a child node of the fourth node, with the second node content type identifier value, and
a twenty-second leaf node, which is a child node of the fourth node, with the third node content type identifier value;

the first grid further comprises seventh, eighth, ninth and tenth rows;

the seventh row is positioned below the first row and above the second and third rows;

the eighth row is positioned below the second and third rows and above the ninth and tenth rows; and the method further comprises populating positions of the first grid as follows:

the seventh row: a value based on the ninth node content type identifier value, the eighth row: a value based on the tenth node content type identifier value, at the first column, ninth row: a value based on the fifteenth node content type identifier value, at the first column, tenth row: a value based on the sixteenth node content type identifier value, at the second column, ninth row: a value based on a value stored in the eighteenth leaf node, at the second column, tenth row: a value based on a value stored in the twenty-first leaf node, at the third column, ninth row: a value based on a value stored in the nineteenth leaf node, and at the third column, tenth row: a value based on a value stored in the twenty-second leaf node.

15. The computer-implemented method of claim 11, wherein the plurality of nodes further comprises:

a fifteenth leaf node, which is a child node of the first node, indicating that the value stored in the second leaf node may be modified on the mobile device; and the method further comprises:

setting the first grid at the second column, second row to be editable, providing a visual indicator that the first grid at the second column, second row is editable, receiving user-entered data into the first grid at the second column, second row, and requesting modification of a management object on the mobile device corresponding to the second leaf node in response to the receiving of the user-entered data.

16. The computer-implemented method of claim 11, wherein the receiving and populating are performed by a web browser application;

the hierarchical data structure is received in XML format;

the method further comprises displaying the first grid in a graphical user interface provided by the web browser application.

17. The computer-implemented method of claim 11, wherein the plurality of nodes further comprises:

a fifteenth leaf node, which is a child node of the first node, storing a text value corresponding to the first node content type identifier value; and the method further comprises populating the first column, second row of the first grid with the text value.

18. The computer-implemented method of claim 11, further comprising:

storing the first grid in a storage device of a computer implementing the method; and presenting the first grid to a user, via a user interface of the computer.

* * * * *